United States Patent [19]

Goble

[11] Patent Number: 5,018,778
[45] Date of Patent: May 28, 1991

[54] PICKUP TRUCK ATTACHMENT APPARATUS

[76] Inventor: Rowland H. Goble, P.O. Box 423, Lake Mary, Fla. 32746

[21] Appl. No.: 505,903

[22] Filed: Apr. 6, 1990

[51] Int. Cl.$^5$ .............................................. B60P 3/345
[52] U.S. Cl. .................................. 296/159; 296/161; 296/164; 296/242; 296/37.6
[58] Field of Search .............. 296/195, 159, 160, 161, 296/164, 24.1, 24.2, 37.6, 39.2, 100, 165; 114/361; 135/88

[56] References Cited

U.S. PATENT DOCUMENTS

| | | | |
|---|---|---|---|
| 1,499,972 | 7/1924 | Canfield | 135/88 X |
| 2,612,027 | 9/1952 | McGan | 296/24.2 X |
| 3,107,649 | 10/1963 | Blend | 296/24.2 X |
| 3,348,874 | 10/1967 | Gorman | 135/88 X |
| 3,606,448 | 9/1971 | Walker | 135/88 X |
| 3,727,971 | 4/1973 | Sisler | 296/156 X |
| 4,091,484 | 5/1978 | Means | 114/361 |
| 4,315,653 | 2/1982 | Sparling | 296/156 X |
| 4,562,786 | 1/1986 | Pruonto | 135/88 X |
| 4,573,731 | 3/1986 | Knaack et al. | 296/37.6 |
| 4,733,898 | 3/1988 | Williams | 296/37.6 X |
| 4,830,242 | 5/1989 | Painter | 296/37.6 X |

OTHER PUBLICATIONS

*Popular Science*, vol. 179, No. 1, p. 90, Jul. 1961.

Primary Examiner—Margaret A. Focarino
Assistant Examiner—Gary C. Hoge
Attorney, Agent, or Firm—William M. Hobby, III

[57] ABSTRACT

A pickup truck attachment allows a pickup truck to be used for carrying a dog box, a camping enclosure, and mounted seats on the back of the truck. The attachment includes a storage compartment shaped to fit in the cargo compartment of a pickup truck which compartment has an entrance in the rear thereof. A platform is attached over the storage compartment to the sidewalls of the cargo compartment to provide a support surface thereover and includes a pair of slide tracks attached to the top thereof. A foldable tent structure has a plurality of frame members and a flexible covering and at least two of the frame members are slidably attached in the slide tracks at one end of the frame members and adapted to slide therein for opening and collapsing the tent structure on top of the platform. A pair of seats are removably attached to the top of the platform for seating on the platform or placing on the ground while camping. The platform includes a pair of storage tanks with a water tap and a filler cap.

11 Claims, 1 Drawing Sheet

PICKUP TRUCK ATTACHMENT APPARATUS

BACKGROUND OF THE INVENTION

The present invention relates to a pickup truck attachment and especially to a pickup truck attachment having a storage compartment covered by a platform for mounting in the cargo space of a pickup truck and having a folding canopy or awning structure mounted to the platform.

In the past, it has been common to provide pickup trucks with a wide variety of attachments for fitting into the cargo space. A common attachment is for tool boxes which are mounted in the cargo space and attached to the sides of the cargo space. There have also been a variety of dog boxes for attaching in pickup trucks as well as various types of camping bodies including rigid covers and foldable canopy and tent structures. Typical prior art patents which show collapsible canopies or tent structures for pickup truck cargo space can be seen in the Feather U.S. Pat. No. 3,688,787 for a longitudinal collapsible canopy for pickup trucks and analogous frames and in the Westmoreland U.S. Pat. No. 2,436,736 for a collapsible canopy frame for a pickup truck and in the Rodrigue U.S. Pat. No. 4,252,363 for a foldaway canopy for a flatbed truck. Also in Biller U.S. Pat. No. 4,310,194 for a tent camper for a pickup truck and in the Bourgeois U.S. Pat. No. 4,289,346 for a collapsible protective mechanism for a pickup truck and in the Cook U.S. Pat. No. 2,670,988 for a folding pickup truck top. These patents typically have a flexible canopy or tent covering material and a plurality of frame members which can be set up or folded to support the canopy to enclose all or part of the cargo space of a pickup truck.

In the Knaack et al. U.S. Pat. No. 4,573,731 a vehicle storage drawer unit attaches to the bottom of a pickup truck cargo space to define a storage drawer which can still carry a load on top of the drawer. In the LeVee U.S. Pat. No. 4,685,695 a watertight, secured truck enclosure is provided in the pickup truck cargo space and the Musgrove et al. U.S. Pat. No. 4,216,990 is a waterproof truck bed cover. The Ogilvie U.S. Pat. No. 3,245,713 is for a pickup truck body construction and the Beals U.S. Pat. No. 4,531,775 is a load bearing security cover for a pickup truck.

In contrast to these prior art canopies and covers for pickup trucks, the present invention provides for a dog box or storage space for a pickup truck having a supporting platform mounting thereover which has the foldable canopy attachment attached to the platform and which has chairs removably mounted to the platform, which chairs are readily removable for use at a campsite.

SUMMARY OF THE INVENTION

A pickup truck attachment allows a pickup truck to be used for carrying a dog box, a camping enclosure, and mounted seats on the back of the truck. The attachment includes a storage compartment shaped to fit in the cargo compartment of a pickup truck which compartment has an entrance in the rear thereof. A platform is attached over the storage compartment to the sidewalls of the cargo compartment to provide a support surface thereover and includes a pair of slide tracks attached to the top thereof. A foldable tent structure has a plurality of frame members and a flexible covering and at least two of the frame members are slidably attached in the slide tracks at one end of the frame members and adapted to slide therein for opening and collapsing the tent structure on top of the platform. A pair of seats are removably attached to the top of the platform for seating on the platform or placing on the ground while camping. The platform includes a pair of storage tanks with a water tap and a filler cap and a storage space therebetween.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 3:
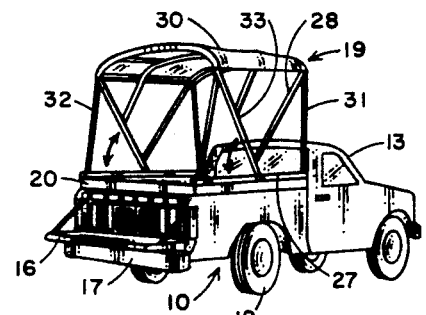
FIG. 3 is a rear perspective view of the pickup truck of FIGS. 1 and 2 having the raised awning.
Figure 4:
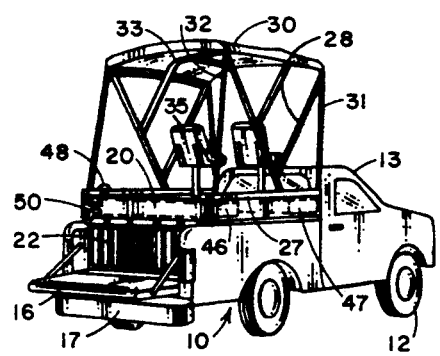
FIG. 4 is a rear perspective view in accordance with FIG. 3 but having seats mounted to the platform.
Figure 5:
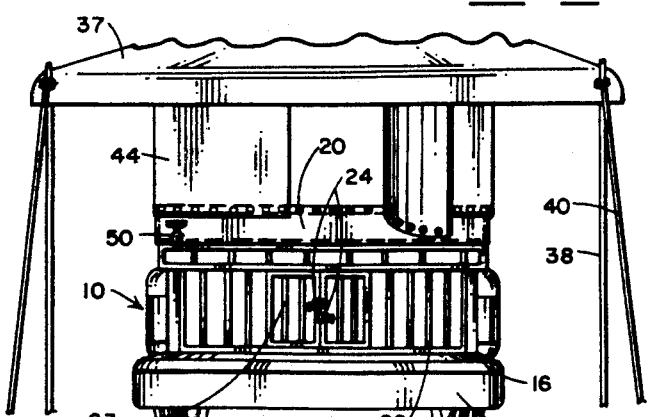
FIG. 5 is a rear elevation of the pickup truck setup in accordance with FIGS. 1 and 2.

Referring to the drawings, a pickup truck 10 has a pickup truck cargo space attachment 11 mounted therein. The truck 10 has a plurality of wheels 12 and a cab 13 and a cargo space 14 along with cargo space sides 15 and a tailgate 16 along with a rear bumper 17. The cargo space has the attachment 11 having a dog box or storage space 18 mounted to fill the cargo space up to the edge 26 of the sidewalls 15. The storage area may have a solid cover 21 or cage bars 22 as desired. The cage bars 22 may have a gate 23, as shown in FIGS. 4 and 5, which may be locked with locks 24 while the storage area in FIG. 1 may be a rigid or flexible cover with a zipper opening 25 if desired. A platform 20 is mounted to the storage compartment 18 and extends over the edges 26 of the cargo bed sidewalls 15 and may be attached directly thereto. A platform 20 has a pair of slide tracks 27 mounted thereto to allow frame members 33 to slide therein when raising or lowering the frame and the canopy or tent top 30. The frame members 31 are at the front of the platform 20 while frame members 32 are at the rear of the platform and an additional U-shaped frame member 33 connects to the frame members 32. The folding operation is similar to the raising and lowering of canopy tops of various types of boats so that the entire canopy top 19 can be folded flat for traveling but also may be in a set up position, as shown in FIG. 3 and 4, for traveling with the canopy up and, if desired, with a pair of seats 35 mounted to the platform 20. The seats 35 are bolted to the platform 20 and may be removed, as shown in FIG. 1, for placement on the ground on their bases 36.

Figure 1:
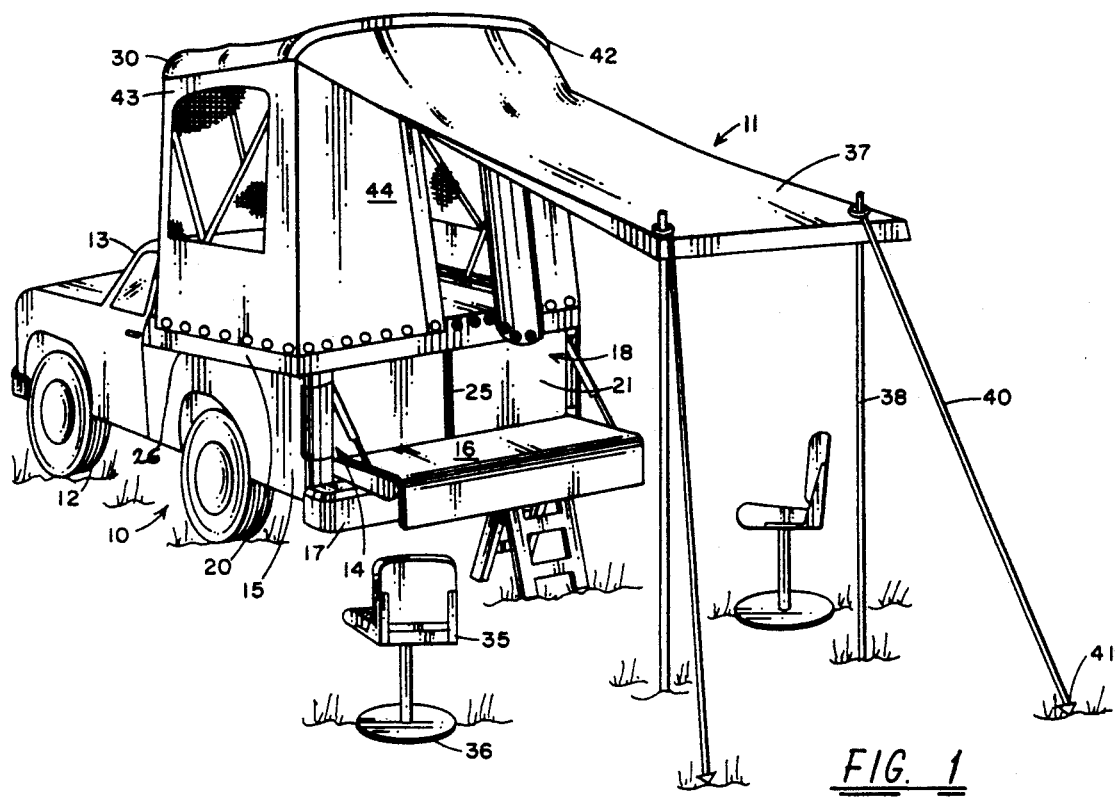
FIG. 1 is a perspective view of my pickup truck set up at a campsite.
Figure 2:
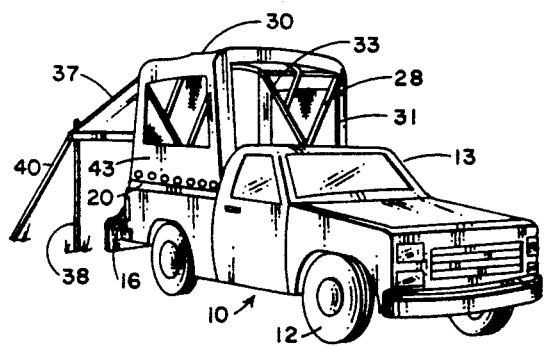
FIG. 2 is a front perspective view of the pickup truck and attachment of FIG. 1.

An extension awning 37 may be attached to the back of the canopy top 30, as shown in FIG. 1, and with the use of two supporting poles 38 and supporting lines 40 extending out and attached to stakes 41 may add an extension awning or porch to the canopy top 30. The awning 37 is attached at 42 such as by a zipper or snaps to the canopy top 30. A pair of tent sides 43 as well as a front and flexible rear tent portion 44 may be attached to form an enclosure under the canopy 30 when camping out. This allows the tailgate 16 to be used as a step or extension. Thus, the dog box with cage members, as shown in FIG. 4, may also be a storage compartment with a cover 21 which may be used for storing or hauling items in a waterproof cargo space. The entire frame members can be folded on hinges and slid on the guide rail 27 to fold the canopy top 30 down flat when the seats 35 are removed and placed in the storage area 18 and the extension awning 37 as well as sides 43 and front and rear tent portions 44 may be stored in a storage area 18. Alternatively, when driving, the canopy top 30 may be raised and the seats 35 mounted, as shown in FIG. 4, so that persons can ride while touring or fishing along a dock or bank in the swivel chairs 35.

The platform 20 also has a storage tank 46 mounted at one end and a storage tank 47 formed in the other end with a storage space therebetween for tools or the like. Each of the storage tanks 46 and 47 can hold water if desired and a filler cap 48 located on the top of tank 46 may be used to fill the tank while a water tap or faucet 50 mounted on the bottom of the tank 46 in the platform 20 may be used for getting water from the storage tank.

It should be clear at this point that a truck body attachment has been provided which has great versatility and which may be used for a watertight storage container in a cargo space of a pickup truck or may be used for a dog box and storage while having water tanks and a storage area formed therein and a platform formed on top thereof and which may have the added advantage of a quickly attachable canopy which can be raised or lowered and may have swivel seats mounted thereto and can be further expanded with awnings and tent sides to form a complete camping and touring attachments having storage for fishing gear, hunting equipment, and dogs as desired. However, the present invention should not be considered limited to the forms shown which are to be considered illustrative rather than restrictive.

I claim:

1. A pickup truck attachment comprising:
a storage compartment shaped to fit into the cargo compartment of a pickup truck, said storage compartment having a pair of sidewalls, each sidewall having a top edge and an entrance through a rear side thereof;
a platform attached over said storage compartment to provide a support surface thereover, said platform having a liquid storage tank thereon;
a pair of slide tracks attached to said platform;
a foldable tend structure having a plurality of frame members and a flexible covering, at least two of said frame members being slidably attached to said pair of slide tracks at one end of said frame members and adapted to slide therein for opening and collapsing said tent structure on top of said platform; and
at least one seat removably attached to said platform.

2. A pickup truck attachment in accordance with claim 1 in which said platform has two liquid storage tanks thereon.

3. A pickup truck attachment in accordance with claim 1 in which said storage compartment includes a dogbox having a plurality of bars at one end thereof and a gate through said bars.

4. A pickup truck attachment in accordance with claim 1 in which said storage compartment has an entrance gate hinged thereto with locking means for locking said gate closed.

5. A pickup truck attachment in accordance with claim 4 in which said foldable tent structure has an awning extension removably attachable thereto.

6. A pickup truck attachment in accordance with claim 1 in which said platform had two seats removably attachably thereto.

7. A pickup truck attachment in accordance with claim 6 in which said seats have bases for placement on the ground when removed from said platform.

8. A pickup truck attachment in accordance with claim 7 in which said platform extends over said cargo compartment sidewalls top edges.

9. A pickup truck attachment in accordance with claim 8 in which said liquid storage tank is a water tank and has a water tap connected thereto.

10. A pickup truck attachment in accordance with claim 9 in which said storage tank has a filler cap in the top thereof.

11. A pickup truck attachment comprising:
a storage compartment shaped to fit into the cargo compartment of a pickup truck, said storage compartment having a pair of sidewalls, each sidewall having a top edge and an entrance through a rear side thereof and said storage compartment having a dogbox having a plurality of bars at one end thereof and a gate through said bars;
a platform attached over said storage compartment to provide a support surface thereover, said platform having a liquid storage tank thereon;
a pair of slide tracks attached to said platform;
a foldable tent structure having a plurality of frame members and a flexible covering, at least two of said frame members being slidably attached to said pair of slide tracks at one end of said frame members and adapted to slide therein for opening and collapsing said tent structure on top of said platform; and
at least one seat removably attached to said platform.

* * * * *